United States Patent
Fang et al.

(10) Patent No.: US 7,807,036 B2
(45) Date of Patent: Oct. 5, 2010

(54) METHOD AND SYSTEM FOR PAD CONDITIONING IN AN ECMP PROCESS

(75) Inventors: Rui Fang, Fishkill, NY (US); Deepak Kulkarni, Wappingers Falls, NY (US); David K Watts, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 11/669,214

(22) Filed: Jan. 31, 2007

(65) Prior Publication Data

US 2008/0182490 A1    Jul. 31, 2008

(51) Int. Cl.
C25F 3/16 (2006.01)
C25F 7/00 (2006.01)
(52) U.S. Cl. .................... 205/640; 205/644
(58) Field of Classification Search ............ 205/640, 205/644

See application file for complete search history.

(56) References Cited

U.S. PATENT DOCUMENTS

| | | | |
|---|---|---|---|
| 5,431,804 A * | 7/1995 | Caballero | 205/621 |
| 5,522,965 A | 6/1996 | Chisholm et al. | |
| 5,575,706 A | 11/1996 | Tsai et al. | |
| 6,592,742 B2 | 7/2003 | Sun et al. | |
| 6,740,169 B2 * | 5/2004 | Cho et al. | 134/3 |
| 6,858,531 B1 | 2/2005 | Zhu et al. | |
| 7,210,988 B2 * | 5/2007 | Wang et al | 451/56 |
| 2002/0006767 A1 | 1/2002 | Wang et al. | |
| 2005/0000801 A1 * | 1/2005 | Wang et al. | 204/267 |
| 2005/0186891 A1 | 8/2005 | Benner | |
| 2006/0042956 A1 * | 3/2006 | Lee et al. | 205/676 |

OTHER PUBLICATIONS

Doscher, et al., Computer Integrated manufacturing (CIM) Framework Specification Version 2.0, SEMATECH, Technology Transfer 93061697J-ENG, Jan. 31, 1998.
Mullins, et al., Advanced Process Control Framework Initiative (APCFI) 1.0 Specifications, SEMATECH, Technology Transfer 97063300A-ENG, Jun. 30, 1997.

* cited by examiner

*Primary Examiner*—Alexa Neckel
*Assistant Examiner*—Zulmariam Mendez
(74) *Attorney, Agent, or Firm*—Ian D. MacKinnon

(57) ABSTRACT

A method and system for pad conditioning in an electrochemical mechanical planarization (eCMP) tool is disclosed. A polishing pad having a pad electrode is placed onto a platen of the eCMP tool. A conditioning disk, having a second electrode is placed on the polishing pad, such that the pad electrode and conditioning disk form an electrode pair. An electric potential is established between the conditioning disk and the pad electrode. This causes debris from the polishing pad to become ionized, and attracted to the conditioning disk. The conditioning disk is then removed from the eCMP tool, allowing the eCMP tool to resume operation on normal semiconductor wafers.

1 Claim, 6 Drawing Sheets

METHOD AND SYSTEM FOR PAD CONDITIONING IN AN ECMP PROCESS

FIELD OF THE INVENTION

The present invention relates to chemical mechanical planarization (CMP) systems. More particularly, the present invention relates to a system for conditioning a polishing pad used in a chemical mechanical planarization (CMP) system.

BACKGROUND

Electrochemical Mechanical Polishing/Planarization (eCMP) is a technique used to remove conductive materials from a substrate surface by electrochemical dissolution while concurrently polishing the substrate with reduced mechanical abrasion as compared to conventional Chemical Mechanical Polishing (CMP) processes. eCMP systems may generally be adapted for deposition of conductive material on the substrate by reversing the polarity of the bias applied between the substrate and an electrode. Electrochemical dissolution is performed by applying a bias between a cathode and a substrate surface to remove conductive materials from the substrate surface into a surrounding electrolyte solution. The bias may be applied to the substrate surface by a conductive contact disposed on or through a polishing material upon which the substrate is processed. The polishing material may be, for example, a polishing pad disposed on a platen. A mechanical component of the polishing process is performed by providing relative motion between the substrate and the polishing material that enhances the removal of the conductive material from the substrate.

The polishing pad is an important aspect of the eCMP process. The polishing pad must have the appropriate mechanical properties for substrate planarization while minimizing the generation of defects in the substrate during polishing. Such defects may be scratches in the substrate surface caused by raised areas of the pad or by polishing by-products disposed on the surface of the pad, such as abraded portions of the pad, agglomerations of abrasive particles from a polishing slurry, removed materials from the substrate, and the like. The polishing pad generally deteriorates naturally during polishing due to wear and/or accumulation of polishing by-products on the pad surface. Thus, the pad surface must periodically be refreshed, or conditioned, to restore the performance of the pad. Conventionally, a diamond conditioning disk is used to work the top layer of the pad surface into a state that possesses desirable polishing results. However, conventional conditioning processes that aggressively interact with the pad may have an adverse affect on the pad lifetime. Additionally, aggressive conditioning processes may cause parts of the conditioning element to come free and be left on the pad after conditioning, which may lead to scratches and defect generation on the substrate surface. Some polishing pads withstand aggressive conditioning relatively well. Other polishing pads are much more sensitive to conditioning by abrasion due to their small thickness, fragility and/or material of composition. Aggressive conditioning of these pads may result in pad damage and/or may severely reduce the pad lifetime, adding to lost service time for pad replacement and increased cost of production.

CMP and eCMP systems are well known in the art, and are the subject of the following references, all of which are incorporated herein by reference: U.S. Pat. No. 6,858,531 (Electro Chemical Mechanical Polishing Method); and U.S. Pat. No. 5,575,706 (Chemical/mechanical Planarization (CMP) Apparatus and Polish Method).

Polishing is a critical part of a semiconductor manufacturing process. Improving throughput of the polishing tools can increase the overall throughput of a semiconductor manufacturing operation. Therefore, there is a need for an improved method for conditioning polishing pads.

SUMMARY OF THE INVENTION

The present invention provides a method for pad conditioning in an electrochemical mechanical planarization (eCMP) tool, comprising the steps of:

disposing a polishing pad having an upper polishing pad surface, a bottom polishing pad surface, and a pad electrode onto a platen of the eCMP tool so that the bottom polishing pad surface is against the platen;

disposing a conditioning disk having a lower disk surface so that the lower disk surface is disposed against the upper polishing pad surface, the conditioning disk forming an electrode, and whereby the conditioning disk and pad electrode form an electrode pair;

establishing an electric potential between the conditioning disk and pad electrode;

moving the upper polishing pad surface with respect to the lower disk surface whereby debris from the polishing pad become ionized and are attracted to the conditioning disk; and removing the conditioning disk from the eCMP tool, thereby completing a conditioning cycle on polishing pad so that it can be used again.

The present invention further provides a method for pad conditioning, in which the step of moving the upper polishing pad surface with respect to the lower disk surface polishing pad includes the step of providing the polishing pad with a plurality of cavities extending between the upper polishing pad surface and the bottom polishing pad surface whereby moving the upper polishing pad surface with respect to the lower disk surface further causes debris from the cavities in the polishing pad to become ionized and attracted to the conditioning disk.

The present invention further provides a method for pad conditioning, in which the step of moving the upper polishing pad surface with respect to the lower disk surface further comprises a step of rotating the polishing pad with respect to the conditioning disk.

The present invention further provides a method for pad conditioning, in which the step of rotating the polishing pad comprises rotating the polishing pad at a rate of between about 10 rpm and about 30 rpm.

The present invention further provides a method for pad conditioning, having an additional step of introducing a conditioning agent between the polishing pad and the conditioning disk selected from the group acid consisting of sulfuric acid, phosphoric acid, and nitric acid into the eCMP tool.

The present invention further provides a method for pad conditioning, in which the step of establishing an electric potential between the conditioning disk and pad electrode includes using the polishing pad electrode as a cathode and the conditioning disk as an anode.

The present invention further provides a method for pad conditioning, in which the step of introducing a conditioning agent comprises introducing a conditioning agent comprised of hydro peroxide.

The present invention further provides a method for pad conditioning, having an additional step of applying a down force onto the conditioning disk.

The present invention further provides a method for pad conditioning, in which the step of applying a down force onto the conditioning disk comprises applying a down force of about 0.5 to 3.0 pounds.

The present invention further provides a method for pad conditioning, in which the step of disposing a conditioning disk comprises disposing a conditioning disk comprised of a semiconductor wafer with a copper layer adapted to make contact with the polishing surface of the polishing pad.

The present invention further provides a method for pad conditioning, in which the step of disposing a conditioning disk comprises disposing a conditioning disk comprised of a metal selected from the group consisting of copper, aluminum, and titanium.

The present invention further provides a method for pad conditioning, in which the step of establishing an electric potential between the conditioning disk and pad electrode includes the step of maintaining the electrical potential for a preset amount of time to complete a conditioning cycle and further including the step of cleaning the conditioning disk of collected debris after the conditioning cycle is complete.

The present invention further provides a method for pad conditioning, in which the step of cleaning the conditioning disk after the conditioning cycle comprises the step of immersing the conditioning disk in a solution comprised of an acid selected from the group consisting of sulfuric acid, phosphoric acid, and nitric acid.

The present invention further provides a system for automated conditioning of a polishing pad of an electrochemical mechanical planarization (eCMP) tool in a semiconductor manufacturing line, comprising:

means for determining if the polishing pad requires conditioning and generating an indication signal that the polishing pad requires conditioning;

an electric power supply connected to the eCMP tool being connected to an electrode interface;

means for controlling the electric power supply;

means for disposing a conditioning disk against the polishing pad in the eCMP tool when the means for determining if the polishing pad generates a signal that the pad requires conditioning; and means for controlling the electric power supply upon generation of the signal that the polishing pad requires conditioning whereby a potential is created on the electrode interface whereby an electric potential is established between the conditioning disk and pad electrode such that debris on the polishing pad becomes ionized and attracted to the conditioning disk thereby removing debris from the polishing pad.

The present invention further provides a system for automated conditioning of a polishing pad, further comprising means for introducing a conditioning agent between the polishing pad and the conditioning disk selected from the group acid consisting of sulfuric acid, phosphoric acid, and nitric acid.

The present invention further provides a system for automated conditioning of a polishing pad, in which the means for determining if the polishing pad requires conditioning comprises means for counting the number of normal polishing cycles, and generating an indication signal when the number exceeds a predetermined threshold.

The present invention further provides a system for automated conditioning of a polishing pad, in which the predetermined threshold is in between 500 and 2,000 normal polishing cycles.

The present invention further provides a system for automated conditioning of a polishing pad, in which the means for determining if the polishing pad requires conditioning comprises means for periodically measuring the time required to complete a normal polishing cycle, and generating an indication signal when that time exceeds a predetermined threshold.

The present invention further provides a system for automated conditioning of a polishing pad, further comprising a means for generating ultrasonic waves in the conditioning disk within the electrochemical mechanical planarization (eCMP) tool.

The present invention further provides a system for automated conditioning of a polishing pad, further comprising a means for generating megasonic waves in the conditioning disk within the electrochemical mechanical planarization (eCMP) tool.

Other objects, features and advantages of the invention will become apparent in light of the following description thereof.

BRIEF DESCRIPTIONS OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. In the drawings accompanying the description that follows, often both reference numerals and legends (labels, text descriptions) may be used to identify elements. If legends are provided, they are intended merely as an aid to the reader, and should not in any way be interpreted as limiting.

Often, similar elements may be referred to by similar numbers in various figures (FIGs.) of the drawing, in which case typically the last two significant digits may be the same, the most significant digit being the number of the drawing figure (FIG).

DETAILED DESCRIPTION

A method and apparatus for conditioning a processing pad is provided herein. The method and apparatus conditions the processing pad with less wear to the pad surface as compared to prior art pad conditioning techniques. The cleaning methods described herein utilize an electrochemical process to remove polishing by-products from the polishing pad substantially without physically removing pad materials. This increases pad life while maintaining processing performance consistency. It is contemplated that the teachings disclosed herein may be used to condition polishing pads in eCMP and/or CMP systems.

Figure 1:
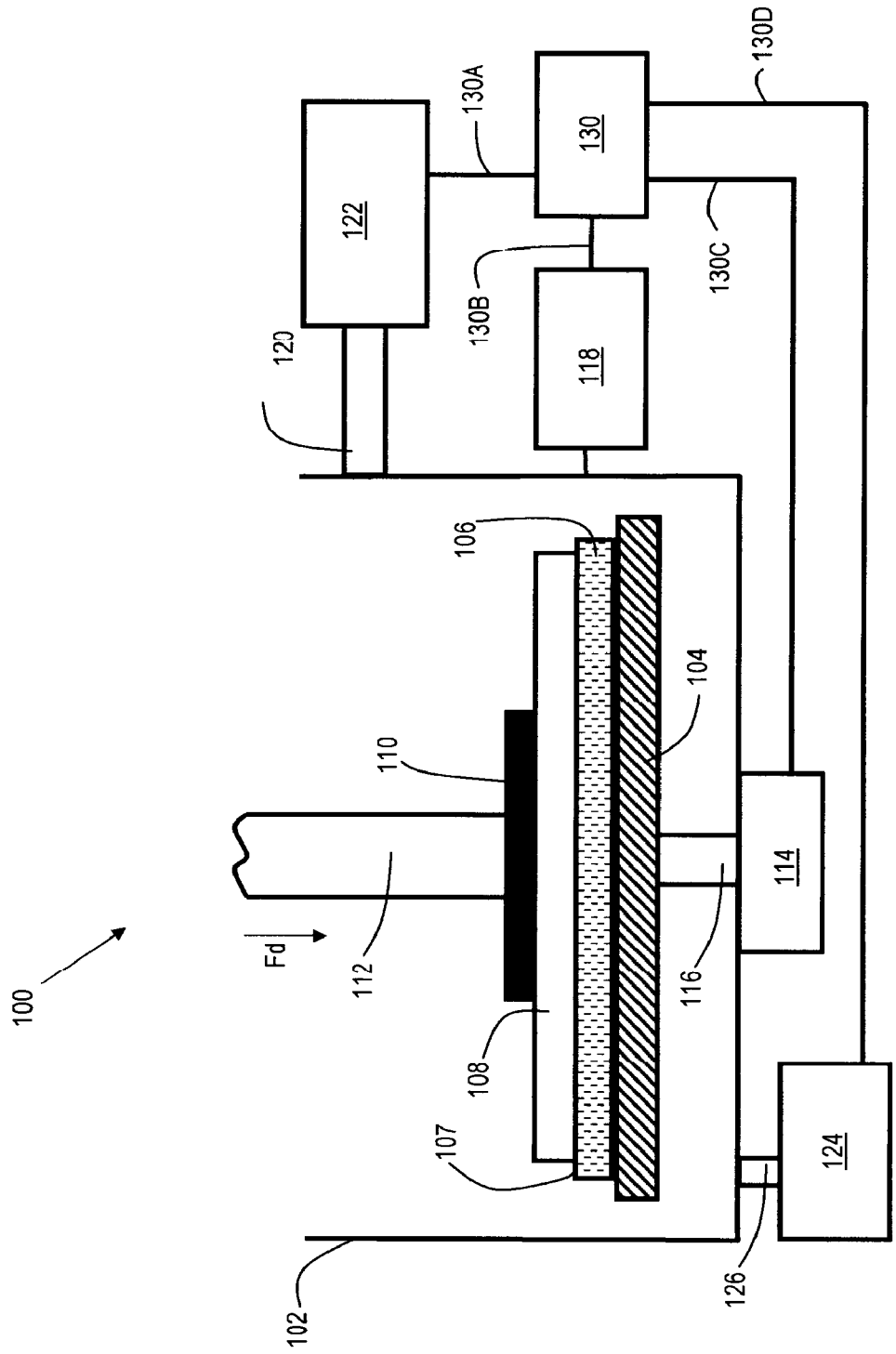
FIG. 1 shows a schematic view of an exemplary embodiment of a system for pad conditioning in an eCMP process according to the present invention.

FIG. 1 shows a schematic view of an exemplary embodiment of an eCMP system 100 of the present invention. The eCMP system has an enclosed, box-like station 102 that is open at the top. Housed within the station 102 is a platen 104. Positioned on top of platen 104 is polishing pad 106. Polishing pad 106 has polishing upper surface 107 that makes contact with the bottom surface of a conditioning workpiece 108, which is positioned on top of polishing pad 106. During normal use, there is a liquid polishing agent between polishing pad 106 and the conditioning workpiece 108. Usually, in normal use, a silicon based semiconductor wafer (not shown) will typically be in place of the conditioning workpiece 108. For the purposes of this invention, "normal use" is the act of performing eCMP on a semiconductor wafer having a plurality of dies intended for production, and is also referred to as a "normal polishing cycle." After a number of normal processing cycles, polishing pad 106 needs to be restored to or close to its original mechanical properties in order to restore the performance of the pad. During the restoration process, there is a liquid conditioning agent, as discussed below, between polishing pad 106 and the conditioning workpiece 108. Also, during the restoration process, conditioning workpiece 108 will be a conditioning disk, similar in shape to a semiconductor wafer to restore polishing pad 106, thereby allowing polishing pad 106 to continue to be used to perform the eCMP process. Conditioning workpiece 108 is held in place by a conventional workpiece holder 110 mounted to an upper surface of the workpiece 108. Holder 110 is attached to a shaft 112. Shaft 112 is coupled to an actuator (not shown), such as, for example, a motor (e.g., a stepper motor) or servo to allow precise motion control for the lowering and raising of shaft 112.

Platen 104 is coupled to a motor 114 via driveshaft 116. Motor 114 rotates driveshaft 116 which in turn rotates platen 104, thereby rotating polishing pad 106. In one embodiment, the rotation rate of platen 104 is between about 10 and about 30 rpm (revolutions per minute). The rotation aids in loosening debris from the polishing pad 106. However, it is also possible to perform the inventive method without rotating the platen 104. In an alternate embodiment, instead of rotating polishing pad 106, the bottom surface of conditioning disk 108 is moved across the entire polishing surface 107 of polishing pad 106.

A controllable, electric power supply (e.g. potentiostat/galvanostat) 118 controls the potential between the two electrodes, as will be discussed below and shown in more detail in FIGS. 2A and 2B. The polishing agent, typically an electrolyte solution or slurry, is input between polishing pad 106 and workpiece 108, dispensed from inlet 120, and metered by control valve 122. The polishing agent is removed from station 102 via outlet 126. In the embodiment of FIG. 1, the polishing agent is removed by pumping system 124. However, it is possible to have an embodiment in which the polishing agent is removed via outlet 126 by gravity, without the need for a pumping system. In one embodiment, phosphoric acid based electrolytes are used as the polishing agent.

The eCMP system 100 has controller 130, which preferably comprises a computer system having a processing unit that executes software, and having a plurality of input and output lines 130a, 130b, 130c, 130d to send and receive data to the various components of the system for the purposes of monitoring and control. As shown in FIG. 1, controller 130 controls motor 114 through line 130c, electrical power supply 118 through line 130b, control valve 122 through line 130a, and pumping system 124 through line 130d. Controller 130 is preferably also adapted to receive data from external devices as part of the manufacturing process. Such an embodiment is shown in more detail in FIG. 3.

Figure 2A:
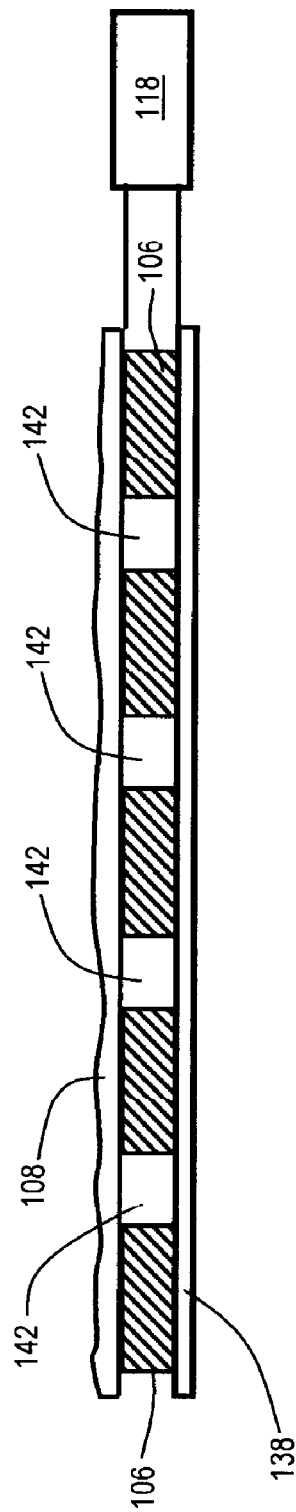
FIGS. 2A-2D show details of polishing pads according to the present invention.
Figure 2B:
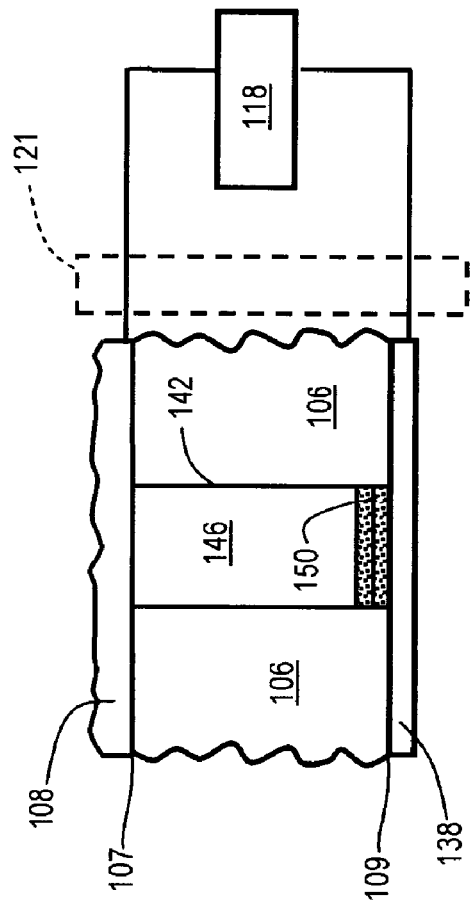
Figure 2C:
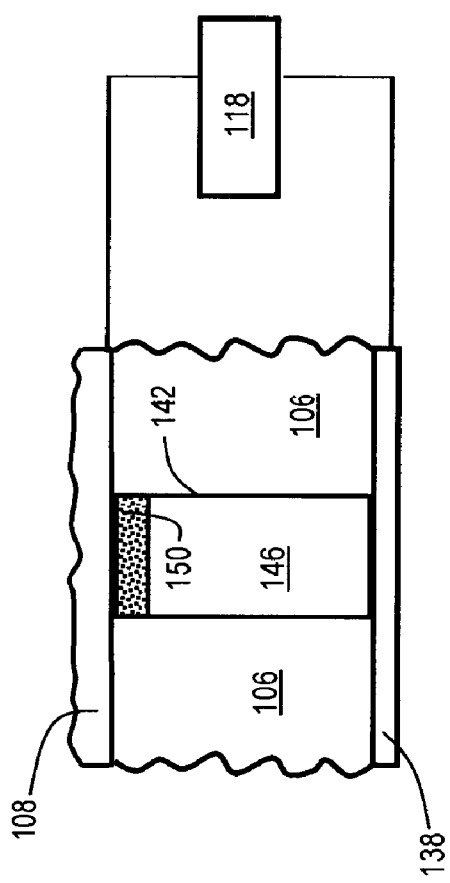

FIGS. 2A-2C show details of the polishing pad. FIG. 2A shows a cross section view of details of the polishing pad 106 and other eCMP components. Polishing pad 106 has a plurality of cavities, each cavity being indicated as 142. The polishing pad 106 has a pad electrode 138 bonded on its bottom surface 109 (the surface opposite the polishing surface). The pad electrode 138 is preferably made of stainless steel, but could also be another corrosion resistant conductive material, such as titanium. In one embodiment of the present invention, the polishing pad used is a modified IC 1000, and is manufactured by Rohm and Haas Corporation, of Newark Del. The modifications to the IC 1000 pad include perforations and attaching of a soft pad underneath (not shown). These modifications are performed for the eCMP process itself and are not a part of the pad conditioning of this invention. The modified IC 1000 pad is made of a rigid, microporous polyurethane material. These properties enable the modified IC 1000 pad to deliver localized planarization, excellent removal rates, and low global non-uniformity. The IC 1000 pad works effectively with slurries and electrolytes to optimize eCMP performance. The conditioning workpiece 108 serves as a second electrode, such that pad electrode 138 and workpiece 108 form a pair of electrodes, hereinafter referred to as an "electrode pair."

In the eCMP system 100 of the present invention, the conditioning workpiece 108 and pad electrode 138 are connected electrically to an electrode interface 121 within eCMP system 100. A potential is created on electrode interface 121 via electrical power supply 118 (See FIG. 2B). This creates a potential between conditioning workpiece 108 and pad electrode 138. During the restoration (conditioning) process, the potential across the electrode interface 121 typically ranges between about 1 volt (V) and about 10V.

While only a few cavities 142 are shown in FIG. 2A, a polishing pad typically will have hundreds or even thousands of cavities 142. It should clearly be understood that FIG. 2A illustrates but a small portion of a polishing pad 106. Also, in "real life" things are not so neat and clean, rectilinear and uniform as shown. However, for one of ordinary skill in the art to which the invention most nearly pertains, this and other figures presented in this patent application will be very useful, when taken in context of the associated descriptive text, for understanding the invention.

FIG. 2B shows a more detailed cross section view the polishing pad 106 and other eCMP components. In this view, details of a cavity 142 within polishing pad 106 are shown. Within the cavity 142, there is a polishing agent 146, such as a slurry or liquid electrolyte solution.

During the normal eCMP process, the polishing pad 106 makes contact with a workpiece 108 that is a semiconductor wafer (hereinafter referred to as a "wafer"). Pad electrode 138 serves as a cathode, and polishing debris 150 is attracted to the pad electrode 138 due to the potential between the conditioning workpiece 108 and pad electrode 138. This potential is controlled via electric power supply 118. After polishing a number (e.g. 500-3000) of wafers, the pad 106 accumulates too much debris 150 in cavity 142 to be effective. For example, when processing a wafer with copper metallization layers (not shown), debris 150 will be in the form of copper particles that accumulate in cavity 142 of the polishing pad 106 and/or on pad electrode 138, reducing its effectiveness. At this time, it is desirable to recondition the polishing pad 106, to allow it to regain effectiveness. To recondition the polishing pad 106, a conditioning disk 108 replaces the standard wafer. Power supply 118 (see FIG. 2A-2C) controls the potential between the conditioning disk 108 and the pad electrode 138.

Figure 2D:
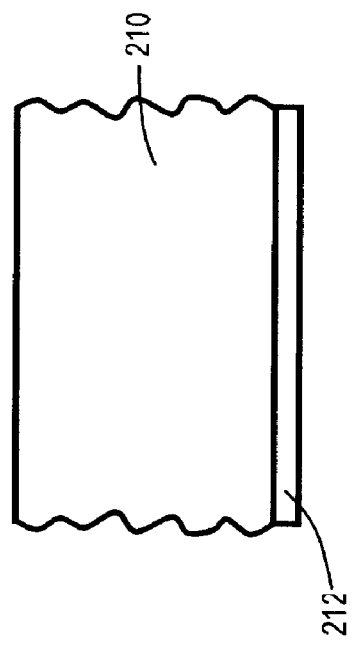

During a conditioning cycle, conditioning disk 108 is used instead of a wafer. In one embodiment, as shown in FIG. 2D, the conditioning disk 208 is a semiconductor wafer 210 with a copper layer 212 disposed thereon. In this case, the copper layer 212 makes contact with the polishing surface 107 of polishing pad 106. This type of conditioning disk is well suited for a disposable application. In another embodiment, the conditioning disk 108 is made of a conductive metal, such as copper, aluminum, or titanium. These disks are well suited to being reused.

FIG. 2C shows the result of a conditioning cycle. During a conditioning cycle, the power supply 118 reverses the potential, such that the conditioning disk or workpiece 108 serves as a cathode, and the pad electrode 138 serves as an anode. Electrochemical reactions take place such as:

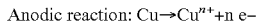
Anodic reaction: $Cu \rightarrow Cu^{n+} + n\ e-$

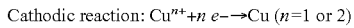
Cathodic reaction: $Cu^{n+} + n\ e- \rightarrow Cu$ ($n=1$ or 2)

The debris 150 becomes ionized, and is attracted to the workpiece or conditioning disk 108. If it is desired to reuse the workpiece 108, then the workpiece 108, now having debris 150 on it, would then be cleaned to allow the conditioning disk to be reused again. One possible method of cleaning is to place the workpiece 108 in an acid bath comprised of a diluted acid such as sulfuric, phosphoric, or nitric acid. This will dissolve the particles of contaminants (e.g. Copper particles) and allow the conditioning disk to be reused again.

Figure 3:
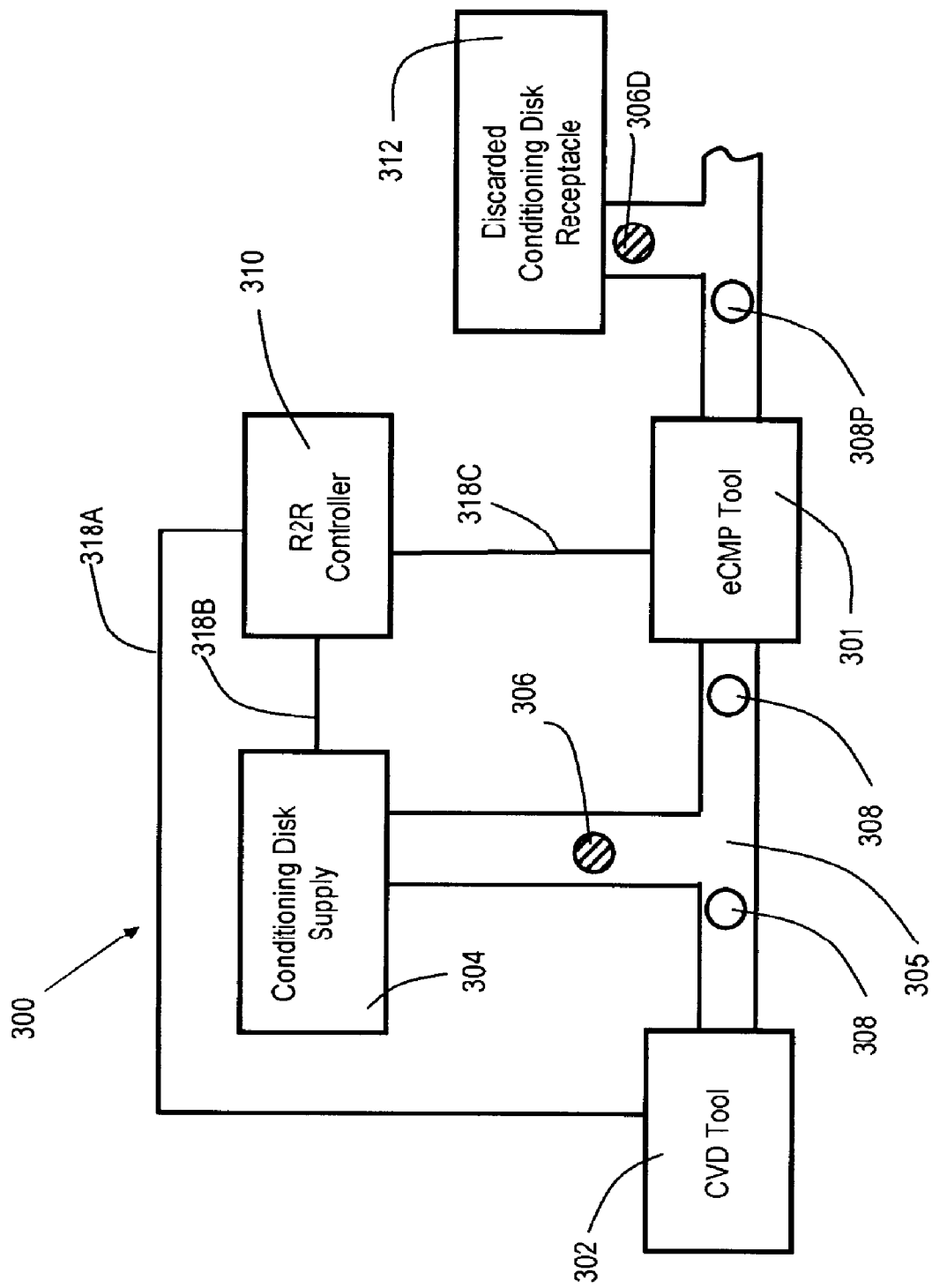
FIG. 3 shows a view of an alternative embodiment of a system for pad conditioning in an eCMP process according to the present invention.

FIG. 3 shows a view of an alternative embodiment of a manufacturing system 300 of the present invention. Manufacturing system 300 comprises the eCMP tool 301 of the present invention, similar to eCMP system 100 that was previously described. In this embodiment, an upstream process tool 302 (for example, a CVD [Chemical Vapor Deposition] Tool) provides a supply of semiconductor wafers 308 that require polishing. The wafers 308 are transported to eCMP tool 301 from process tool 302 via wafer transport system 305. Wafer 308P has exited from the eCMP tool 301 as a polished wafer, and now proceeds to subsequent manufacturing steps beyond the scope of the present invention. A Run-to-Run controller 310 (hereinafter abbreviated as "R2R Controller") controls the various components of system 300 via a data communications network 318 including network connections 318a, 318b, 318c. While data communications network 318 illustrates a possible interconnection scheme, those skilled in the art will recognize that other network topologies are possible. Furthermore, data communication may be established wirelessly, without the use of physical connections, without departing from the scope of the present invention. R2R Controller 310 may use standard factory automation methods for semiconductor manufacturing, such as the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI (The Semiconductor Equipment and Materials Institute, commonly known as SEMI. This is an organization headquartered in San Jose, Calif., that publishes various specifications for the semiconductor industry). The APC is a preferred platform from which to implement the control strategy taught by the present invention. In some embodiments, the APC can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

The R2R Controller 310 communicates with the CVD Tool 302 via network connection 318a, the eCMP Tool 301 via network connection 318c, and the wafer transport system 305 via a transport controller (not shown). Note that while a CVD Tool 302 is shown in FIG. 3 as an example, the nature and function of the "upstream tool" is not critical to the function of the present invention, so long as it is capable of supplying a workpiece to the eCMP Tool 301. In one embodiment, the R2R controller 310 receives an indication, such as a message (or signal) from eCMP Tool 301 indicating that pad conditioning is required. The criteria for generating this message may be the polishing of a predetermined number of semiconductor wafers. For example, after polishing 2,000 semiconductor wafers 308, the eCMP Tool 301 may send the "pad conditioning required" message to the R2R controller 310 via data communications network connection 318c. Alternatively, the eCMP tool 301 may have means to automatically monitor the condition of polishing pad 106 (FIG. 1) and to generate the message when it is deemed that the polishing pad requires conditioning.

In one embodiment, the polishing time required is monitored to automatically determine when a conditioning cycle is necessary. This provides for automated conditioning of the polishing pad 106 (FIG. 1) as required during operation of manufacturing system 300.

As the polishing pad 106 (FIG. 1) becomes slightly less effective after each normal use, the time required to polish the surface layer of semiconductor wafer to the desired thickness increases. When the polishing time reaches a predetermined threshold, a conditioning cycle is then initiated by generation of the "pad conditioning required" message, as discussed previously.

Upon receiving the "pad conditioning required" message, the R2R controller 310 will control the wafer transport system 305 to enable a conditioning disk 306 to be transported from conditioning disk supply 304 to the eCMP tool 301. In this embodiment, the conditioning disk 306 is preferably formed from a semiconductor wafer with a layer of copper deposited thereon, and is intended to be discarded after use. When the conditioning disk 306 becomes the workpiece 108 (FIG. 1) of eCMP tool 301, then R2R controller 310 will send a "conditioning cycle ready" message to the eCMP tool via data communications network 318c. Upon receipt of the "conditioning cycle ready" message, the eCMP tool 301 will set its power supply 118 (see FIG. 1) to the conditioning mode. A potential is then created such that the workpiece 108 (see FIG. 1) serves as the cathode, and the pad electrode 138 (see FIG. 2A) serves as the anode. The cleaning process described by FIGS. 2A-2C then takes place, thereby conditioning the polishing pad 106 (FIG. 1) of the eCMP tool 301, enabling further polishing of semiconductor wafers 308. When a conditioning disk (306D) exits eCMP tool 301, the R2R controller may control transport system 305 such that the conditioning disk 306D to be discarded is sent to a used conditioning disk receptacle 312. The conditioning disks 306D within the used conditioning disk receptacle 312 may be restored, preferably by immersing the conditioning disks in an acid bath to dissolve debris that adhere to the conditioning disk during a pad conditioning cycle. Alternatively, if disposable conditioning disks are used, the conditioning disks are simply discarded.

When the pad conditioning cycle is complete, the eCMP tool 301 generates a "conditioning cycle complete" message that is sent to the other devices in the system 300, such as R2R controller 310, in order to restore the conditions necessary for processing normal semiconductor wafers.

Figure 4:
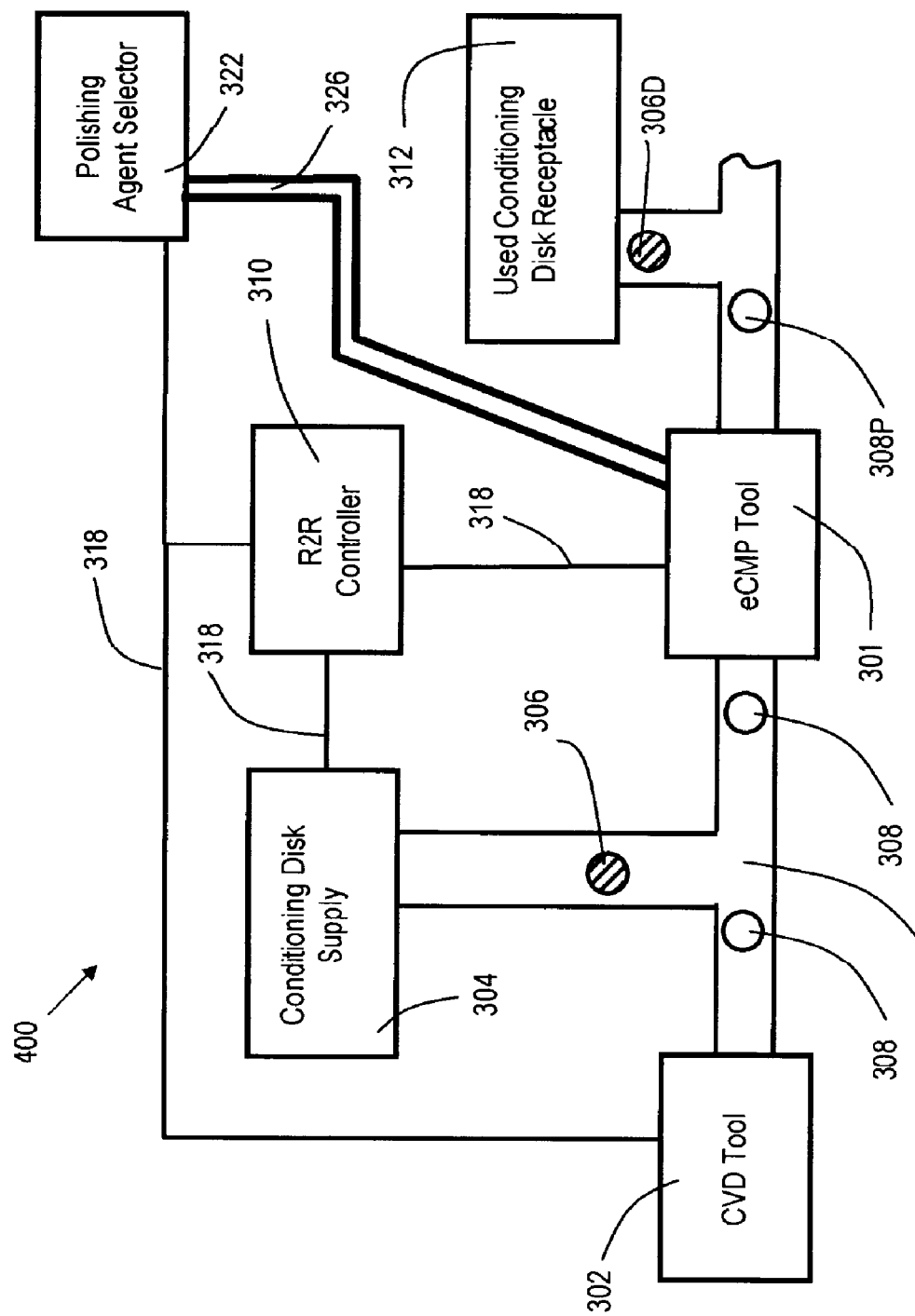
FIG. 4 shows a view of another alternative embodiment of a system for pad conditioning in an eCMP process according to the present invention.

FIG. 4 shows a view of yet another embodiment of a manufacturing system 400 of the present invention. Manufacturing system 400 is similar to manufacturing system 300, with the addition of a polishing agent selector 322. The polishing agent selector 322 is preferably implemented via plumbing with control valves and data communication means (not shown), such that it can direct the appropriate polishing agent to eCMP tool 301. In this embodiment, upon receipt of the "conditioning cycle ready" message, the eCMP tool 301, in addition to performing the steps mentioned previously in the discussion of FIG. 3, will also communicate with polishing agent selector 322. Polishing agent selector 322 then introduces a new polishing agent to the eCMP tool 301 via conduit 326. In this embodiment, the polishing agent is a "conditioning agent", i.e., a polishing agent that is customized for the conditioning cycle. When the conditioning cycle is complete, the eCMP tool 301 generates a "conditioning cycle complete" message that is provided to the other devices in the system 400, such as R2R controller 310, in order to restore the conditions necessary for processing normal semiconductor wafers. This includes selecting a polishing agent for semiconductor wafers, via polishing agent selector 322.

Figure 5:
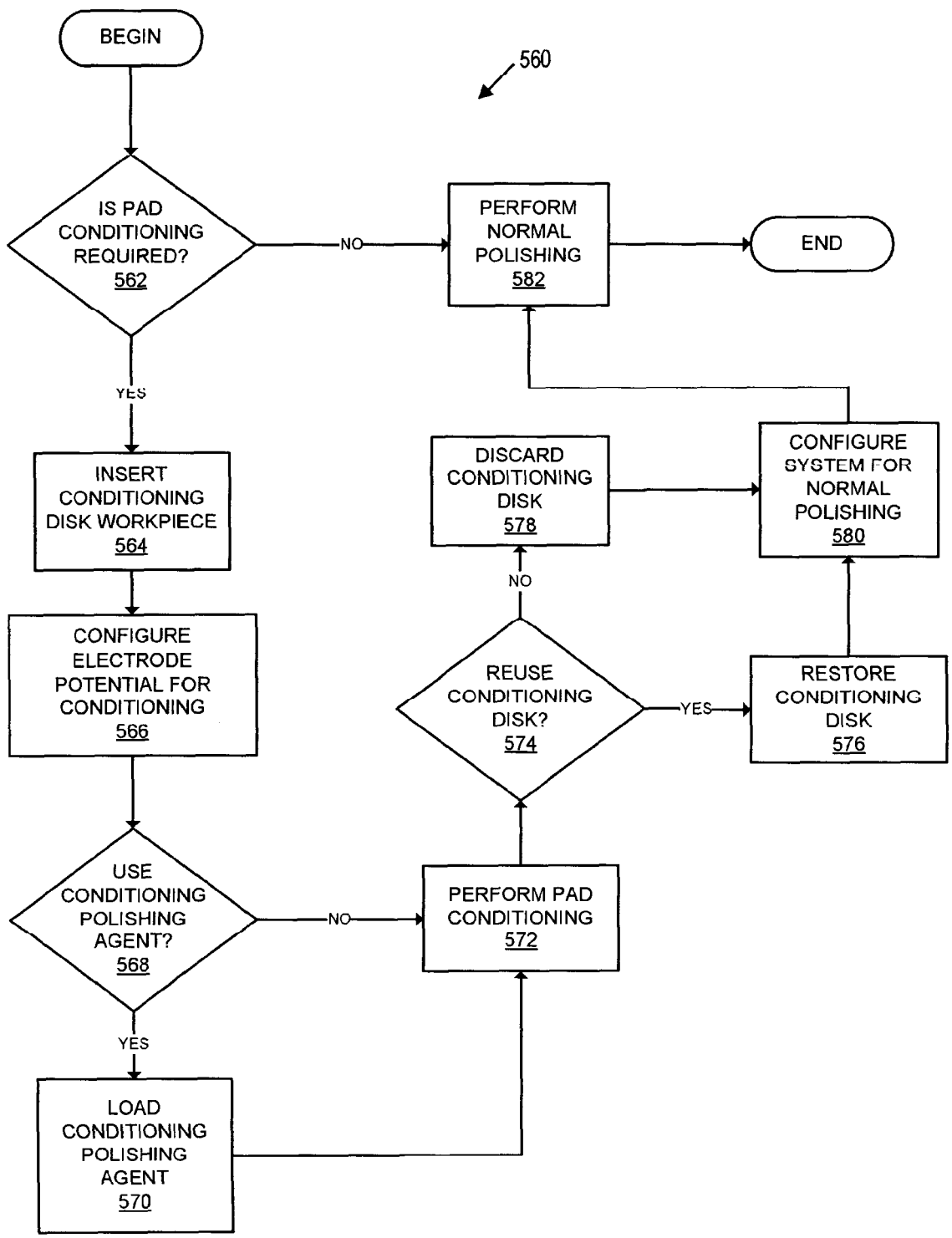
FIG. 5 shows a flowchart indicating steps to perform the method of pad conditioning in an eCMP process according to the present invention.

FIG. 5 shows a flowchart 560 indicating process steps to perform the method of the present invention.

In process step 562, the evaluation of the need for pad conditioning is performed by a eCMP Tool corresponding to eCMP Tool 301 of FIGS. 3 or 4. The evaluation may comprise maintaining a record of the number of semiconductor wafers polished, and generating an indication of the pad conditioning required after a predetermined number of semiconductor wafers (e.g. 2,000) have been polished by the eCMP tool 301, as discussed hereinbefore. In an alternative embodiment, process step 562 is implemented by monitoring the polishing time required to automatically determine when a conditioning cycle is necessary.

Next, in process step 564, a conditioning disk workpiece, corresponding to workpiece 108 of FIG. 1, is inserted into the eCMP tool corresponding to eCMP Tool 301 of FIG. 3 or FIG. 4. This is preferably performed by wafer transport system 305, which receives instructions from R2R controller 310 via data communications network 318.

Next, in process step 566, the electric potential between the workpiece (108 of FIG. 1) and the pad electrode (138 of FIG. 2A) is configured for pad conditioning by establishing an electric potential such that the workpiece (108 of FIG. 1), which is a conditioning disk, serves as a cathode, and the pad electrode (138 of FIG. 2A) serves as an anode. This electric potential is controlled via power supply (118 of FIG. 2A).

Next, in process step 568, a configuration option is checked to determine if a different polishing agent is to be used for the pad conditioning cycle. It is possible to practice the present invention using one polishing agent for both normal semiconductor wafer polishing, and pad conditioning. However, it is possible to use a different polishing agent for pad conditioning. This allows one to "fine tune" the polishing agent for the specific application (e.g. normal semiconductor wafer polishing or pad conditioning). This configuration option is preferably stored in the controller (130 FIG. 1) of the eCMP tool corresponding to eCMP Tool 301 of FIG. 3 or FIG. 4. If a different polishing agent is to be used, process step 570 is performed. Otherwise, process step 570 is skipped, and the process proceeds directly to process step 572.

In process step 570, the conditioning polishing agent is loaded. This step may entail removing the polishing agent that is currently in the eCMP Tool 301 by removing the polishing agent from station 102 by pumping system 124, via outlet 126 (FIG. 1).

Then, a message is sent to a polishing agent selector (322, FIG. 4) via data communications network 318, causing polishing agent selector (322, FIG. 4) to supply a conditioning polishing agent to eCMP tool 301 via conduit 326.

In process step 572, the pad conditioning is performed by eCMP Tool 301, which rotates polishing pad (106 FIG. 1) via motor (114, FIG. 1) and driveshaft (116, FIG. 1), while applying the desired electric potential between the electrode pair (108, 138, FIG. 2A), as discussed hereinbefore.

Next, in process step 574, a configuration option is checked to determine if the conditioning disk is to be reused. It is possible to practice the present invention with reusable conditioning disks. It is also possible to practice the present invention with disposable conditioning disks. Disposable conditioning disks are preferably made by depositing a layer of copper on a normal semiconductor wafer. If the conditioning disk is to be reused, process step 576 is performed. Otherwise, process step 576 is skipped, and the process proceeds to process step 578, where the conditioning disk is discarded.

In step 576, reusable conditioning disks are restored. This is preferably accomplished via immersion in an acid bath, such as diluted sulfuric, nitric, or phosphoric acid. The acid bath may optionally contain an oxidation agent such as hydro peroxide.

In step 580, with the pad conditioning cycle complete, the eCMP system (corresponding to system 300 of FIG. 3, or system 400 of FIG. 4) is configured to resume normal semiconductor wafer polishing. This step includes configuring power supply (118, FIG. 2A) to create the appropriate electric potential between the workpiece (108, FIG. 2A) and the pad electrode (138, FIG. 2A). This step may also include loading a new polishing agent via polishing agent selector (322, FIG. 4).

In step 582, normal semiconductor wafer polishing continues. In this step, the workpiece (108, FIG. 1) is a normal semiconductor wafer (i.e. a wafer that is intended to produce known good dies for a manufacturing operation). The input of normal semiconductor wafers into eCMP Tool 301 is preferably performed by wafer transport system 305, which receives instructions from R2R controller 310 via data communications network 318.

In addition to the aforementioned electrochemical process, a chemical process may also be combined. Adding diluted acid (sulfuric, phosphoric, or nitric) with possibly an oxidation agent such as hydro peroxide to the polishing agent aids in the dissolving of contaminants during the conditioning process.

In yet another embodiment, mechanical processes may also be included, For example. The conditioning disk may be abrasive, to help loosen contaminants from the pad. A down force Fd (FIG. 1) can optionally be applied to the workpiece (conditioning disk) 108 via shaft 112 (FIG. 1) to enhance conditioning effectiveness. In one embodiment, the down force used is in the range of about 0.5 to 3.0 pounds.

In yet another embodiment, a transducer for generating ultrasonic (e.g. 30 to 100 kHz) or megasonic (e.g. 0.8 to 1.2 MHz) waves may also be included. For example, the conditioning disk may be coupled with an ultrasonic tip to enhance conditioning effectiveness. An ultrasonic or megasonic transducer can integrated with the workpiece holder 110. Alternatively, the transducer may be a stand-alone unit (not shown) in station 102 working in-situ or ex-situ with this electrochemical conditioning operation.

The present invention has a variety of advantages, including the advantage of improving pad life. Unlike pure mechanical pad conditioning, which primarily cleans the pad at the surface, the present invention cleans the pad throughout, restoring the pad closer to like new conditions. This allows the pad to be used for longer periods, thereby saving costs associated with replacement pads.

Because the pads are cleaned more thoroughly, there is improved process stability, and reduced variation in the polishing/planarization process. There is reduced tool downtime, since the pad conditioning process can be treated similar to the polishing of a wafer. Overall, the reduced downtime will increase overall throughput of wafers in a semiconductor manufacturing line.

As can be seen from the preceding description, the present invention provides an improved method and system for pad conditioning in an eCMP process. It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for pad conditioning in an electrochemical mechanical planarization (eCMP) tool, comprising the steps of:

disposing a polishing pad having an upper polishing pad surface, a bottom polishing pad surface, and a pad electrode onto a platen of the eCMP tool so that the bottom polishing pad surface is against the platen;

disposing a conditioning disk having a lower disk surface so that the lower disk surface is disposed against the upper polishing pad surface, the conditioning disk forming an electrode, and whereby the conditioning disk and pad electrode form an electrode pair, and wherein the conditioning disk is comprised of a semiconductor wafer with a copper layer adapted to make contact with the polishing surface of the polishing pad;

establishing an electric potential between the conditioning disk and pad electrode using the polishing pad electrode as an anode and the conditioning disk as a cathode and maintaining the electrical potential for a preset amount of time to complete a conditioning cycle;

moving the upper polishing pad surface with respect to the lower disk surface whereby debris from the polishing pad become ionized and are attracted to the conditioning disk and providing the polishing pad with a plurality of cavities extending between the upper polishing pad surface and the bottom polishing pad surface whereby moving the upper polishing pad surface with respect to the lower disk surface further causes debris from the cavities in the polishing pad to become ionized and attracted to the conditioning disk and further rotating the polishing pad with respect to the conditioning disk at a rate of between about 10 rpm and about 30 rpm;

introducing a conditioning agent between the polishing pad and the conditioning disk selected from the group acid consisting of sulfuric acid, phosphoric acid, hydro peroxide and nitric acid into the eCMP tool;

applying a down force of about 0.5 to 3.0 pounds onto the conditioning disk;

cleaning the conditioning disk of collected debris Mier the conditioning cycle is complete by immersing the conditioning disk in a solution comprised of an acid selected from the group consisting of sulfuric acid, phosphoric acid, and nitric acid; and removing the conditioning disk from the eCMP tool, thereby completing a conditioning cycle on polishing pad so that it can be used again.

\* \* \* \* \*